(12) United States Patent
Hinckley et al.

(10) Patent No.: US 9,294,539 B2
(45) Date of Patent: Mar. 22, 2016

(54) COOPERATIVE FEDERATION OF DIGITAL DEVICES VIA PROXEMICS AND DEVICE MICRO-MOBILITY

(71) Applicant: Microsoft Corporation, Redmond, WA (US)

(72) Inventors: Kenneth P. Hinckley, Redmond, WA (US); Nicolai Marquardt, Calgary (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 338 days.

(21) Appl. No.: 13/829,657

(22) Filed: Mar. 14, 2013

(65) Prior Publication Data

US 2014/0280748 A1 Sep. 18, 2014

(51) Int. Cl.
*G06F 15/173* (2006.01)
*H04L 29/08* (2006.01)

(52) U.S. Cl.
CPC ..................................... *H04L 67/02* (2013.01)

(58) Field of Classification Search
CPC ......... A63F 13/12; A63F 13/06; A63F 13/02; A63F 2300/1087; G06F 3/011; G06F 3/0304; G06T 19/006; H04M 1/6066; H04M 1/7253; H04M 1/72544; H04M 2250/12; H04W 4/02; H04L 67/02; H04L 29/08
USPC .......................................... 709/217, 218, 219
See application file for complete search history.

(56) References Cited

U.S. PATENT DOCUMENTS

| | | |
|---|---|---|
| 5,812,865 A | 9/1998 | Theimer et al. |
| 6,157,935 A | 12/2000 | Tran et al. |
| 6,545,669 B1 | 4/2003 | Kinawi et al. |
| 6,599,130 B2 | 7/2003 | Moehrle |
| 7,006,881 B1 | 2/2006 | Hoffberg et al. |
| 7,036,128 B1 | 4/2006 | Julia et al. |
| 7,200,559 B2 | 4/2007 | Wang |
| 7,434,166 B2 | 10/2008 | Acharya et al. |
| 7,532,196 B2 | 5/2009 | Hinckley |
| 7,609,644 B2 | 10/2009 | Tateson |
| 7,627,139 B2 * | 12/2009 | Marks ..................... A63F 13/00 345/156 |
| 7,636,794 B2 | 12/2009 | Ramos et al. |
| 7,809,192 B2 | 10/2010 | Gokturk et al. |
| 7,970,870 B2 | 6/2011 | Hinckley et al. |
| 7,995,090 B2 | 8/2011 | Liu et al. |
| 8,204,437 B1 | 6/2012 | Rothschild |
| 8,312,392 B2 | 11/2012 | Forutanpour et al. |
| 8,413,077 B2 | 4/2013 | Yamamoto et al. |
| 8,452,057 B2 | 5/2013 | Chen et al. |

(Continued)

OTHER PUBLICATIONS

"International Search Report", Mailed Date: Jun. 20, 2013, Application No. PCT/US2013/037042, Filed Date: Apr. 18, 2013, pp. 8.

(Continued)

*Primary Examiner* — Anthony Mejia
(74) *Attorney, Agent, or Firm* — Alin Corie; Kate Drakos; Micky Minhas

(57) ABSTRACT

The subject disclosure is directed towards co-located collaboration/data sharing that is based upon detecting the proxemics of people and/or the proxemics of devices. A federation of devices is established based upon proxemics, such as when the users have entered into a formation based upon distance between them and orientation. User devices may share content with other devices in the federation based upon micro-mobility actions performed on the devices, e.g., tilting and/or otherwise interacting with a sending device.

20 Claims, 9 Drawing Sheets

(56) References Cited

U.S. PATENT DOCUMENTS

| | | | |
|---|---|---|---|
| 8,555,207 | B2 | 10/2013 | Hildreth et al. |
| 8,771,071 | B2* | 7/2014 | Zalewski ........................ 463/36 |
| 8,789,131 | B2* | 7/2014 | Choi et al. .................... 725/148 |
| 8,923,760 | B2* | 12/2014 | Iwasaki ....................... 455/41.1 |
| 2002/0036617 | A1* | 3/2002 | Pryor ............................ 345/156 |
| 2002/0116205 | A1 | 8/2002 | Ankireddipally et al. |
| 2002/0184373 | A1 | 12/2002 | Maes |
| 2003/0105812 | A1 | 6/2003 | Flowers, Jr. et al. |
| 2003/0145094 | A1 | 7/2003 | Staamann et al. |
| 2003/0222917 | A1 | 12/2003 | Trantow |
| 2004/0029640 | A1* | 2/2004 | Masuyama ............. A63F 13/06 463/43 |
| 2005/0030255 | A1 | 2/2005 | Chiu et al. |
| 2006/0171695 | A1 | 8/2006 | Jung et al. |
| 2006/0265664 | A1 | 11/2006 | Simons et al. |
| 2006/0287085 | A1* | 12/2006 | Mao ........................ A63F 13/06 463/37 |
| 2007/0002783 | A1 | 1/2007 | Krantz et al. |
| 2007/0018968 | A1* | 1/2007 | Iwamoto ................ A63F 13/00 345/173 |
| 2007/0111735 | A1 | 5/2007 | Srinivasan et al. |
| 2007/0115358 | A1 | 5/2007 | McCormack |
| 2007/0118804 | A1* | 5/2007 | Raciborski et al. .......... 715/745 |
| 2007/0255807 | A1 | 11/2007 | Hayashi et al. |
| 2008/0102855 | A1* | 5/2008 | Forbes et al. ............. 455/456.1 |
| 2008/0106621 | A1 | 5/2008 | Jung et al. |
| 2008/0119272 | A1* | 5/2008 | Zalewski ........................ 463/37 |
| 2008/0120401 | A1* | 5/2008 | Panabaker et al. ........... 709/223 |
| 2008/0122871 | A1* | 5/2008 | Guday .......................... 345/634 |
| 2008/0194323 | A1* | 8/2008 | Merkli .................... A63F 13/02 463/30 |
| 2009/0158220 | A1 | 6/2009 | Zalewski et al. |
| 2009/0201896 | A1 | 8/2009 | Davis et al. |
| 2009/0254614 | A1 | 10/2009 | Brush et al. |
| 2009/0274137 | A1 | 11/2009 | Hall et al. |
| 2009/0309846 | A1 | 12/2009 | Trachtenberg et al. |
| 2009/0322676 | A1 | 12/2009 | Kerr et al. |
| 2010/0009749 | A1* | 1/2010 | Chrzanowski, Jr. ..... A63F 13/10 463/35 |
| 2010/0009751 | A1* | 1/2010 | Shimamura ............. A63F 13/10 463/36 |
| 2010/0009760 | A1* | 1/2010 | Shimamura ............. A63F 13/02 463/43 |
| 2010/0053206 | A1* | 3/2010 | Ohnishi ................ G06F 3/0481 345/619 |
| 2010/0137063 | A1* | 6/2010 | Shirakawa ............. A63F 13/10 463/31 |
| 2010/0261466 | A1 | 10/2010 | Chang et al. |
| 2010/0293198 | A1 | 11/2010 | Marinucci et al. |
| 2010/0328346 | A1* | 12/2010 | Watson ......................... 345/649 |
| 2011/0093820 | A1 | 4/2011 | Zhang et al. |
| 2011/0111851 | A1* | 5/2011 | Hayashida ............. A63F 13/10 463/36 |
| 2011/0148752 | A1 | 6/2011 | Alameh et al. |
| 2011/0159813 | A1* | 6/2011 | Mallinson et al. .......... 455/41.2 |
| 2011/0159814 | A1* | 6/2011 | Mallinson ............... A63F 13/12 455/41.2 |
| 2011/0159959 | A1* | 6/2011 | Mallinson ............... A63F 13/06 463/37 |
| 2011/0195782 | A1* | 8/2011 | Mao et al. ..................... 463/37 |
| 2011/0197147 | A1 | 8/2011 | Fai |
| 2011/0205341 | A1 | 8/2011 | Wilson et al. |
| 2011/0216002 | A1* | 9/2011 | Weising et al. ............... 345/158 |
| 2011/0292036 | A1 | 12/2011 | Sali et al. |
| 2011/0319166 | A1 | 12/2011 | Bathiche et al. |
| 2012/0011197 | A1 | 1/2012 | Arisawa et al. |
| 2012/0017147 | A1 | 1/2012 | Mark |
| 2012/0075327 | A1* | 3/2012 | Mackenzie .................. 345/589 |
| 2012/0093355 | A1 | 4/2012 | Levien et al. |
| 2012/0140083 | A1 | 6/2012 | Schultz et al. |
| 2012/0192084 | A1 | 7/2012 | Dura et al. |
| 2012/0218191 | A1 | 8/2012 | Huang et al. |
| 2012/0236210 | A1* | 9/2012 | Matsubayashi ............... 348/739 |
| 2013/0072301 | A1* | 3/2013 | Mallinson ..................... 463/36 |
| 2013/0103446 | A1 | 4/2013 | Bradgon et al. |
| 2013/0112066 | A1* | 5/2013 | Mizuta .................... A63F 13/06 84/626 |
| 2013/0162501 | A1* | 6/2013 | Tsuda .................... G06F 3/1438 345/1.1 |
| 2013/0182892 | A1 | 7/2013 | Horvitz et al. |
| 2013/0194438 | A1 | 8/2013 | Sweet et al. |
| 2013/0225289 | A1* | 8/2013 | Yoshimitsu ............. A63F 13/10 463/31 |
| 2013/0286223 | A1 | 10/2013 | Latta et al. |
| 2014/0024453 | A1* | 1/2014 | Eberwein ................ A63F 13/06 463/33 |
| 2014/0225814 | A1* | 8/2014 | English ................ G02B 27/017 345/8 |
| 2014/0258445 | A1* | 9/2014 | McCoy et al. ................ 709/217 |
| 2015/0038231 | A1* | 2/2015 | Mahlmeister ........... A63F 13/06 463/37 |
| 2015/0217190 | A1* | 8/2015 | Coyne .................... A63F 13/63 463/31 |

OTHER PUBLICATIONS

U.S. Appl. No. 13/455,797, Non Final Office Action Mailed Jun. 21, 2013, 12 pages.

U.S. Appl. No. 13/455,797, Final Office Action Mailed Dec. 20, 2013, 11 pages.

U.S. Appl. No. 13/455,797, Non Final Office Action Mailed May 19, 2014, 15 pages.

U.S. Appl. No. 13/455,797, Final Office Action Mailed Aug. 29, 2014, 13 pages.

Hutama, et al., "Distinguishing Multiple Smart-Phone Interactions on a Multi-touch Wall Display using Tilt Correlation", Proceedings of the 2011 annual conference on Human factors in computing systems (CHI '11), May 7-12, 2011, pp. 3315-3318, Association for Computing Machinery (ACM), Vancouver, British Columbia, Canada.

Paek, et al., "Toward Universal Mobile Interaction for Shared Displays", Proceedings of the 2004 Association for Computing Machinery (ACM) conference on Computer supported cooperative work (CSCW04), Nov. 6-10, 2004, pp. 266-269, ACM, Chicago, Illinois.

Myers, "Mobile Devices for Control", Proceedings of the 4th International Symposium on Mobile Human-Computer Interaction (Mobile HCI '02), Sep. 18-20, 2002, pp. 1-8, Springer-Verlag, Pisa, Italy.

Jeon, et al., "Interaction Techniques in Large Display Environments using Hand-held Devices", Proceedings of the Association for Computing Machinery (ACM) symposium on Virtual reality software and technology (VRST '06), Nov. 1-3, 2006, pp. 100-103, ACM, Limassol, Cyprus.

Olson, et al., "Small group design meetings: an analysis of collaboration", Human-Computer Interaction (HCI '92), Dec. 1992, pp. 347-374, vol. 7, Issue 4, L. Erlbaum Associates Inc., Hillsdale, New Jersey.

Biehl, et al., "FASTDash: A Visual Dashboard for Fostering Awareness in Software Teams", Proceedings of the Special Interest Group on Computer Human Interaction (SIGCHI) conference on Human factors in computing systems (CHI '07), Apr. 28-May 3, 2007, pp. 1313-1322, Association for Computing Machinery (ACM), San Jose, California.

Ballendat et al., "Proxemic Interaction: Designing for a Proximity and Orientation-Aware Environment", Proceedings of the Association for Computing Machinery (ACM) International Conference on Interactive Tabletops and Surfaces (ITS '10), Nov. 7-10, 2010, pp. 121-130, ACM, SaarbrOcken, Germany.

Fitzmaurice, et al., "Sentient Data Access via a Diverse Society of Devices", Queue—Instant Messaging magazine, Nov. 2003, pp. 52-63, vol. 1, Issue 8, Association for Computing Machinery (ACM), New York, New York.

Streitz, et al., "i-LAND: An interactive Landscape for Creativity and Innovation", Proceedings of the Association for Computing Machinery (ACM) Conference on Human Factors in Computing Systems (CHI '99), May 15-20, 1999, pp. 120-127, ACM, Pittsburgh, Pennsylvania.

Johanson, et al., "The Interactive Workspaces Project: Experiences with Ubiquitous Computing Rooms", Institute of Electrical and Elec-

(56) References Cited

OTHER PUBLICATIONS tronics Engineers (IEEE) Pervasive Computing, Apr.-Jun. 2002, pp. 71-78, 1536-1268/02, IEEE Educational Activities Department, Piscataway, New Jersey.
Rekimoto, et al., "Augmented Surfaces: A Spatially Continuous Work Space for Hybrid Computing Environments", Proceedings of the Association for Computing Machinery (ACM) Conference on Human Factors in Computing Systems (CHI '99), May 15-20, 1999, pp. 378-385, ACM, Pittsburgh, Pennsylvania.
Brooks, et al., "The Intelligent Room Project", Proceedings of the 2nd International Conference on Cognitive Technology (CT '97), Aug. 25-28, 1997, pp. 271-278, Institute of Electrical and Electronics Engineers (IEEE), Aizu-Wakamatsu City, Japan.
Krumm, et al., "Multi-camera multi-person tracking for EasyLiving", Proceedings of the Third Institute of Electrical and Electronics Engineers (IEEE) International Workshop on Visual Surveillance (VS'OO), Jul. 1, 2000, pp. 1-8, IEEE, Dublin, Ireland.
Rekimoto, "A multiple device approach for supporting whiteboard-based interactions", Proceedings of the Special Interest Group on Computer Human Interaction (SIGCHI) conference on Human factors in computing systems (CHI '98), Apr. 18-23, 1998, pp. 344-351, Association for Computing Machinery (ACM) Press/Addison-Wesley Publishing Co., Los Angeles, California.
Rekimoto, "Multiple-computer user interfaces: "beyond the desktop" direct manipulation environments", Extended abstracts from Conference on Human Factors in Computing Systems (CHI '00), Apr. 1-6, 2000, pp. 6-7, Association for Computing Machinery (ACM), The Hague, Netherlands.
Wigdor, et al., "WeSpace: the design development and deployment of a walk-up and share multi-surface visual collaboration system", Proceedings of the 27th international conference on Human factors in computing systems (CHI '09), Apr. 4-9, 2009, pp. 1237-1246, Association for Computing Machinery (ACM), Boston, Massachusetts.
Myers, "Using Multiple Devices Simultaneously for Display and Control", Institute of Electrical and Electronics Engineers (IEEE) Personal Communications, Oct. 2000, pp. 62-65, vol. 7, Issue 5, IEEE, New York, New York.
Izadi, et al., "Dynamo: a public interactive surface supporting the cooperative sharing and exchange of media", Proceedings of the 16th annual Association for Computing Machinery (ACM) symposium on User interface software and technology (UIST '03), Nov. 2-5, 2003, pp. 159-168, ACM, Vancouver, Canada.
Greenberg, et al., "PDAs and Shared Public Displays: Making Personal Information Public, and Public Information Personal", Personal Technologies, vol. 3, Issue 1, Mar. 1999, pp. 54-64, Springer-Verlag, London, United Kingdom.
Li, et al., "Virtual Shelves: Interactions with Orientation Aware Devices", Proceedings of the 22nd annual Association for Computing Machinery (ACM) symposium on User interface software and technology (UIST '09), Oct. 4-7, 2009, pp. 125-128, ACM, Victoria, British Columbia, Canada.
Bolt, "Put-That-There: Voice and Gesture at the Graphics Interface", Proceedings of the 7th annual conference on Computer graphics and interactive techniques (SIGGRAPH '80), Jul. 14-18, 1980, pp. 262-270, vol. 14, Issue 3, Association for Computing Machinery (ACM), Seattle, Washington.
Oviatt, et al., "Integration and synchronization of input modes during multimodal human-computer interaction", Proceedings of the Special Interest Group on Computer Human Interaction (SIGCHI) conference on Human factors in computing systems (CHI '97), Mar. 22-27, 1997, pp. 415-422, ACM, Atlanta, Georgia.
Zeleznik, et al., "Hands-on math: a page-based multi-touch and pen desktop for technical work and problem solving", Proceedings of the 23nd annual Association for Computing Machinery (ACM) symposium on User interface software and technology (UIST '10), Oct. 3-6, 2010, pp. 17-26, ACM, New York, New York.
Baudel, et al., "CHARADE: Remote Control of Objects using Free-Hand Gestures", Communications of the Association for Computing Machinery (ACM)—Special issue on computer augmented environments: back to the real world, Jul. 1993, pp. 28-35, vol. 36, Issue 7, ACM, New York, New York.
Hinckley, et al., "A survey of design issues in spatial input", Proceedings of the 7th annual Association for Computing Machinery (ACM) symposium on User interface software and technology (UIST '94), Nov. 2-4, 1994, pp. 213-222, ACM, Marina del Rey, California.
Bragdon, et al., "Gesture Select: Acquiring Remote Targets on Large Displays without Pointing", Proceedings of the 2011 annual conference on Human factors in computing systems (CHI '11), May 7-12, 2011, pp. 187-196, Association for Computing Machinery (ACM), Vancouver, British Columbia, Canada.
Mangano, et al., "Calico: A Prototype Sketching Tool for Modeling in Early Design", Proceedings of the 2008 international workshop on Models in software engineering (MiSE '08), May 10-18, 2008, pp. 63-68, Association for Computing Machinery (ACM), Leipzig, Germany.
Parnin, et al., "CodePad: Interactive Spaces for Maintaining Concentration in Programming Environments", Proceedings of the 5th international symposium on Software visualization (SOFTVIS '10), Oct. 25-26, 2010, pp. 15-24, Association for Computing Machinery (ACM), Salt Lake City, Utah.
Rekimoto, et al., "Pick-and-drop: a direct manipulation technique for multiple computer environments", Proceedings of the 10th annual Association for Computing Machinery (ACM) symposium on User interface software and technology (UIST '97), Oct. 14-17, 1997, pp. 31-39, ACM, Banff, Alberta, Canada.
Wilson, et al., "BlueTable: Connecting Wireless Mobile Devices on Interactive Surfaces Using Vision-Based Handshaking", Proceedings of Graphics Interface 2007 (GI '07), May 28-30, 2007, pp. 119-125, Association for Computing Machinery (ACM), Montreal, Canada.
Bragdon, et al., "GestureBar: Improving the Approachability of Gesture-based Interfaces", Proceedings of the 27th international conference on Human factors in computing systems (CHI '09), Apr. 4-9, 2009, pp. 2269-2278, Association for Computing Machinery (ACM), Boston, Massachusetts.
Rico, et al., "Usable Gestures for Mobile Interfaces: Evaluating Social Acceptability", Proceedings of the 28th international conference on Human factors in computing systems (CHI '10), Apr. 10-15, 2010, pp. 887-896, Association for Computing Machinery (ACM), Atlanta, Georgia.
Bragdon, et al., "Code Bubbles: A Working Set-based Interface for Code Understanding and Maintenance", Proceedings of the 28th international conference on Human factors in computing systems (CHI '10), Apr. 10-15, 2010, pp. 2503-2512, Association for Computing Machinery (ACM), Atlanta, Georgia.
Morris, et al., "Cooperative Gestures: Multi-User Gestural Interactions for Co-located Groupware", Proceedings of the Special Interest Group on Computer Human Interaction (SIGCHI) conference on Human Factors in computing systems (CHI '06), Apr. 22-28, 2006, pp. 1201-1210, Association for Computing Machinery (ACM), Montreal, Quebec, Canada.
Bump Technologies, Inc., "The Bump App for iPhone and Android", retrieved at <<http://bu.mp/>>, Jun. 20, 2011, pp. 1, Bump Technologies, Inc.
Hinckley, et al., "Stitching: Pen Gestures that Span Multiple Displays", Proceedings of the working conference on Advanced visual interfaces (AVI '04), May 25-28, 2004, pp. 23-31, Association for Computing Machinery (ACM), Gallipoli (Lecce), Italy.
Bier, et al., "Toolglass and magic lenses: the see-through interface", Proceedings of the 20th annual conference on Computer graphics and interactive techniques (SIGGRAPH '93), Aug. 1993, pp. 73-80, Association for Computing Machinery (ACM), Anaheim, California.
Kurtenbach, et al., The Limits of Expert Performance Using Hierarchic Marking Menus, Proceedings of the INTERACT '93 and CHI '93 conference on Human factors in computing systems, Apr. 24-29, 1993, pp. 482-487, Association for Computing Machinery (ACM), Amsterdam, Netherlands.
Schoning, et al., "Using Mobile Phones to Spontaneously Authenticate and Interact with Multi-Touch Surfaces", Workshop on designing multi-touch interaction techniques for coupled public and private displays (PPD '08), May 31, 2008, pp. 41-45, retrieved at <<http://

(56) References Cited

OTHER PUBLICATIONS www.mendeley.com/research/using-mobil e-phones-spontaneously-authenticate-interact-multitouch-surfaces-1/#p. 1 >>, Napoli, Italy.
Gellersen, et al., "Supporting device discovery and spontaneous interaction with spatial references", Journal of 42 Personal and Ubiquitous Computing, May 2009, pp. 255-264, vol. 13, Issue 4, Springer-Verlag, London, United D Kingdom.
Wigdor, et al., "Integrated Virtual Environment", U.S. Appl. No. 13/084,786 filed with USPTO on Apr. 12, 2011 (not yet published).
Benko, et al., "Providing an Interactive Experience Using a 30 Depth Camera and a 3D Projector", U.S. Appl. No. 13/074,041 filed with USPTO on Mar. 29, 2011 (not yet published).
U.S. Appl. No. 13/278,065, Non Final Office Action Mailed Dec. 4, 2013, 25 pages.
Rekimoto, et al., J., "SyncTap: An Interaction Technique for Mobile Networking", New Generation of IP-Phone Enabled Mobile Devices, Mobile HCI 2002, pp. 319-323, 2002.
Hinckley, K.., "Bumping Object Together as a Semantically Rich Way Forming Connections between Ubiquitous Devices", UbiComp 2003 conference, Oct. 12, 2003, 2 pages.
Hinckley, K., "Synchronous Gestures for Multiple Persons and Computer", Proceedings of the 16th Annual ACM Symposium on User Interface Software and Technology, Vancouver, Canada, Nov. 2•5, 2003, 11 pages.
Hinckley, K., Distributed and Local Sensing Techniques for Face-to-Face Collaboration (Short Paper), Proceedings of the 5th International Conference on Multi-modal Interfaces, Vancouver, British Columbia, Canada, Nov. 3-5, 2003, 4 pages.
U.S. Appl. No. 10/697,056, Non Final Office Action Mailed Jan. 24, 2008, 18 pages.
U.S. Appl. No. 10/697,056, Final Office Action Mailed Aug. 7, 2008, 19 pages.
U.S. Appl. No. 10/697,056, Notice of Allowance Mailed Mar. 2, 2009, 7 pages.
U.S. Appl. No. 10/697,056, Notice of Allowability Mailed Mar. 2, 2009, 4 pages.
Zou, et al., "A Distributed Coverage- and Connectivity-Centric Technique for Selecting Active Nodes", In IEEE Transactions on Computers, vol. 54, Issue 8, Aug. 2005, 14 pages.
U.S. Appl. No. 13/352,487, Non Final Office Action Mailed Oct. 28, 2013, 14 pages.
U.S. Appl. No. 13/352,487, Notice of Allowance Mailed Apr. 9, 2014, 14 pages.
Vazquez-Fernandez, et al., "Built-in face recognition for smart photo sharing in mobile devices", IEEE International Conference on Multimedia and Expo (ICME), Jul. 11-15, 2011, pp. 1-4.
"iPhoto'11", Oct. 27, 2011, pp. 6.
Davis, et al., "MMM2: Mobile Media Metadata for Media Sharing", Extended Abstracts of the Conference on Human Factors in Computing Systems, 2005, pp. 1335-1338.
"Share pictures and videos", Oct. 27, 2011, pp. 3.
U.S. Appl. No. 11/263,401, Non Final Office Action Mailed Sep. 26, 2008, 22 pages.
U.S. Appl. No. 11/263,401, Final Office Action Mailed May 13, 2009, 21 pages.
U.S. Appl. No. 11/263,401, Notice of Allowance Mailed Jul. 24, 2009, 9 pages.
Marquardt, et al., "Gradual Engagement: Facilitating Information Exchange between Digital Devices as a Function of Proximity", In Proceedings of the ACM International Conference on Interactive Tabletops and Surfaces, Nov. 11, 2012, 10 pages.
Ballendat, Till K., "Visualization of and Interaction with Digital Devices around Large Surfaces as a Function of Proximity", Retrieved on: Jan. 31, 2013, Available at: http://grouplab.cpsc.ucalgary.ca/grouplab/uploads/Publications/Publications/2011-Ballendat.DiplomeThesis.pdf.
Holmquist, et al., "Smart-Its Friends: A Technique for Users to Easily Establish Connections between Smart Artefacts", In Proceedings of the 3rd International Conference on Ubiquitous Computing, Sep. 30, 2001, 6 pages.

Marquardt, Nicolai, "Informing the Design of Proxemic Interactions", In Research Report 2011-1006-18, Department of Computer Science, University of Calgary, Jul. 2011, 9 pages.
Ballendat, et al., "Proxemic Interaction: Designing for a Proximity and Orientation—Aware Environment", In Proceedings of ACM International Conference on Interactive Tabletops and Surfaces, Nov. 7, 2010, 10 pages.
Biehl, et al., "ARIS: An Interface for Application Relocation in an Interactive Space", In Proceedings of Graphics Interface, May 17, 2004, 10 pages.
Bragdon, et al., "Code Space: Touch + Air Gesture Hybrid Interactions for Supporting Developer Meetings", In Proceedings of ITS, Nov. 2011, 10 pages.
Buxton, William A.S., "Living in Augmented Reality: Ubiquitous Media and Reactive Environments, in Video Mediated Communication", In Video;—Mediated Communication, Jan. 31, 2013, 17 pages.
Dearman, et al., "Determining the Orientation of Proximate Mobile Devices using their Back Facing Camera", In Proceedings of the SIGCHI Conference on Human Factors in Computing Systems, May 5, 2012, 4 pages.
Everitt, et al., "MultiSpace: Enabling Electronic Document Micromobility in Table-Centric, Multi-Device Environments", In Proceedings of the First IEEE International Workshop on Horizontal Interactive Human-Computer Systems, Jan. 5, 2006, 8 pages.
Greenberg, et al., "Proxemic Interactions: The New Ubicomp?", In Journal of Magazine Interactions, vol. 18, Issue 1, Jan. 2011, 11 pages.
Hassan, et al., "Chucking: A One-Handed Document Sharing Technique", In Proceedings of the 12th IFIP TC 13 International Conference on Human-Computer Interaction: Part II, Aug. 2009, 15 pages.
Hinckley, Ken, "Synchronous Gestures for Multiple Users and Computers", In Proceedings of 16th Annual ACM Symposium on User Interface Software and Technology, Nov. 2, 2003, 10 pages.
Hinckley, et al., "Codex: A Dual-Screen Tablet Computer", In Proceedings of the SIGCHI Conference on Human Factors in Computing Systems, Apr. 9, 2009, 10 pages.
Hung, et al., "Detecting F-Formations as Dominant Sets", In Proceedings of the 13th International Conference on Multimodal Interfaces, Nov. 14, 2011, 8 pages.
Johanson, et al., "PointRight: Experience with Flexible Input Redirection in Interactive Workspaces" In Proceedings of the 15th Annual ACM Symposium on User Interface Software and Technology, Oct. 27, 2002, 8 pages.
Ju, et al., "Range: Exploring Implicit Interaction through Electronic Whiteboard Design", In Proceedings of the ACM Conference on Computer Supported Cooperative Work, Nov. 8, 2008, 10 pages.
Kindberg, et al., "System Software for Ubiquitous Computing", In Journal of IEEE Pervasive Computing, vol. 1, Issue 1, Jan. 2002, 12 pages.
Kruger, et al., "How People Use Orientation on Tables: Comprehension, Coordination and Communication", In Proceedings of the International ACM SIGGROUP Conference on Supporting Group Work, Nov. 9, 2003, 10 pages.
Luff, et al., "Mobility in Collaboration", In Proceedings of the ACM Conference on Computer Supported Cooperative Work, Nov. 14, 1998, 10 pages.
Marquardt, et al., "The Proximity Toolkit: Prototyping Proxemic Interactions in Ubiquitous Computing Ecologies", In Proceedings of the 24th Annual ACM Symposium on User Interface Software and Technology, Oct. 16, 2011, 11 pages.
Marshall, et al., "Using F-Formations to Analyse Spatial Patterns of Interaction in Physical Environments", In Proceedings of the ACM Conference on Computer Supported Cooperative Work, Mar. 19, 2011, 10 pages.
Ramos, et al., "Synchronous Gestures in Multi-Display Environments", In Journal of Human—Computer Interaction, vol. 24, Jan. 31, 2013, 105 pages.
Rodden, Tom, "Populating the Application: A Model of Awareness for Cooperative Applications", In Proceedings of the ACM Conference on Computer Supported Cooperative Work, Nov. 1996, 10 pages.

(56) References Cited

OTHER PUBLICATIONS

Schilit, et al., "Context-Aware Computing Applications", In Proceedings of the First Workshop on Mobile Computing Systems and Applications, Dec. 8, 1994, 6 pages.

Tashman, et al., "LiquidText: A Flexible, Multitouch Environment to Support Active Reading", In Proceedings of the SIGCHI Conference on Human Factors in Computing Systems, May 7, 2011, 10 pages.

Vogel, et al., "Interactive Public Ambient Displays: Transitioning from Implicit to Explicit, Public to Personal, Interaction with Multiple Users", In Proceedings of the 17th Annual ACM Symposium on User Interface Software and Technology, Oct. 24, 2004, 10 pages.

Wang, et al., "Proxemic Peddler: A Public Advertising Display that Captures and Preserves the Attention of a Passerby", In Proceedings of the International Symposium on Pervasive Displays, Jun. 4, 2012, 6 pages.

Want, et al., "The Active Badge Location System", In Proceedings of ACM Transactions on Information Systems, vol. 10, Issue 1, Jan. 1992, 10 pages.

Wilson, et al., "Combining Multiple Depth Cameras and Projectors for Interactions on, Above, and Between Surfaces", In Proceedings of the 23rd Annual ACM Symposium on User Interface Software and Technology, Oct. 3, 2010, 10 pages.

Marquardt, et al., "Cross-Device Interaction via Micro-mobility and F-formations" In Proceedings of the 25th Annual ACM Symposium on User Interface Software and Technology, Oct. 7, 2012, 10 pages.

Ciolek, et al., "Environment and the Spatial Arrangement of Conversational Encounters", Sociological Inquiry 1980, 50(3-4): p. 237-271.

Kendon, A., "Spacing and Orientation in Co-Present Interaction", in COST'09 Proceedings 2nd Int'l Conf on Development of Multimodal Interfaces: Active Listening and Synchrony, Springer-Verlag Berlin: Heidelberg. p. 1-15.

Dunbar, et all, "Size and Structure of Freely Forming Conversational Groups", Human Nature, 1995. 6(1): p. 67-78.

Hall, E.T., "The Hidden Dimension", 1966, New York: Doubleday.

\* cited by examiner

COOPERATIVE FEDERATION OF DIGITAL DEVICES VIA PROXEMICS AND DEVICE MICRO-MOBILITY

BACKGROUND

Despite the ongoing proliferation of useful digital devices having various form-factors such as slates and electronic whiteboards, such technology often hinders (rather than helps) interactions between small groups of people. Whereas natural human conversation is fluid and dynamic, discussions that rely on digital content, such as slides, documents, and clippings, often remain stilted and unnatural due to the awkwardness of manipulating, sharing, and displaying information on and across multiple devices.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which a server is configured to process image data to determine a formation based upon proxemics of users having digital devices. The server further maintains federation data corresponding to which devices are in the formation and communicates the federation data to the devices to establish a federation between the devices. This server may reside on one or more of the federated devices, on a host in the local environment, or be distributed in "the cloud" (e.g. among various networked servers hosting data and services).

In one aspect, upon establishing a federation among devices, including devices associated with one or more users, (and/or one or more devices associated with no users). the federation data indicative of the federation is maintained and used to determine a set of federated devices that are able to communicate data between one another. The communication is based upon the federation and one or more micro-mobility actions.

In one aspect content is received at a recipient device from a sending device, in which the sending device and the recipient device are participants in a federation established via proxemics between the devices. The content is rendered on the recipient device, including rendering the content in partial, increasing amounts over time until fully rendered. The rendering in partial, increasing amounts occurs from one direction based upon the relative locations of the devices to have the content appear to have come from a direction of the sending device relative to the recipient device.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards having mobile devices such as slates and tablets, as well as situated devices such as desktops, tabletops, and electronic whiteboards, operate in a manner that is based upon the physical co-presence ("proxemics") of nearby persons and devices. To this end, the distance and relative body orientation amongst small groups of co-located users is sensed, and combined with motion and orientation sensor data (e.g., via a three-axis accelerometer/gyroscope sensor) to allow nuanced and subtle device motions to initiate sharing of content, or overtures to share content, amongst users. The system also may determine device identity and coarse-grained proximity information amongst the devices themselves. Further, multi-touch and pen gestures input to the devices, or motion gestures articulated using the devices themselves (shaking, tilting, twisting, bumping, etc.), can be used to explicitly initiate exchanges, and/or parameterize what content (if any) is being offered to other users.

As will be understood, the resulting multi-modal fusion of sensors and inputs allows techniques for sharing amongst devices that are automatically federated based upon the physical person-to-person distance, as well as the physical relative body orientation, amongst groups of co-located users. Examples include passing back and forth of pieces of content amongst a small circle of users standing together, while excluding other persons who may happen to be nearby, but are facing away or otherwise excluded (e.g., outside a formation "circle" but facing it) from the small-group formation.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
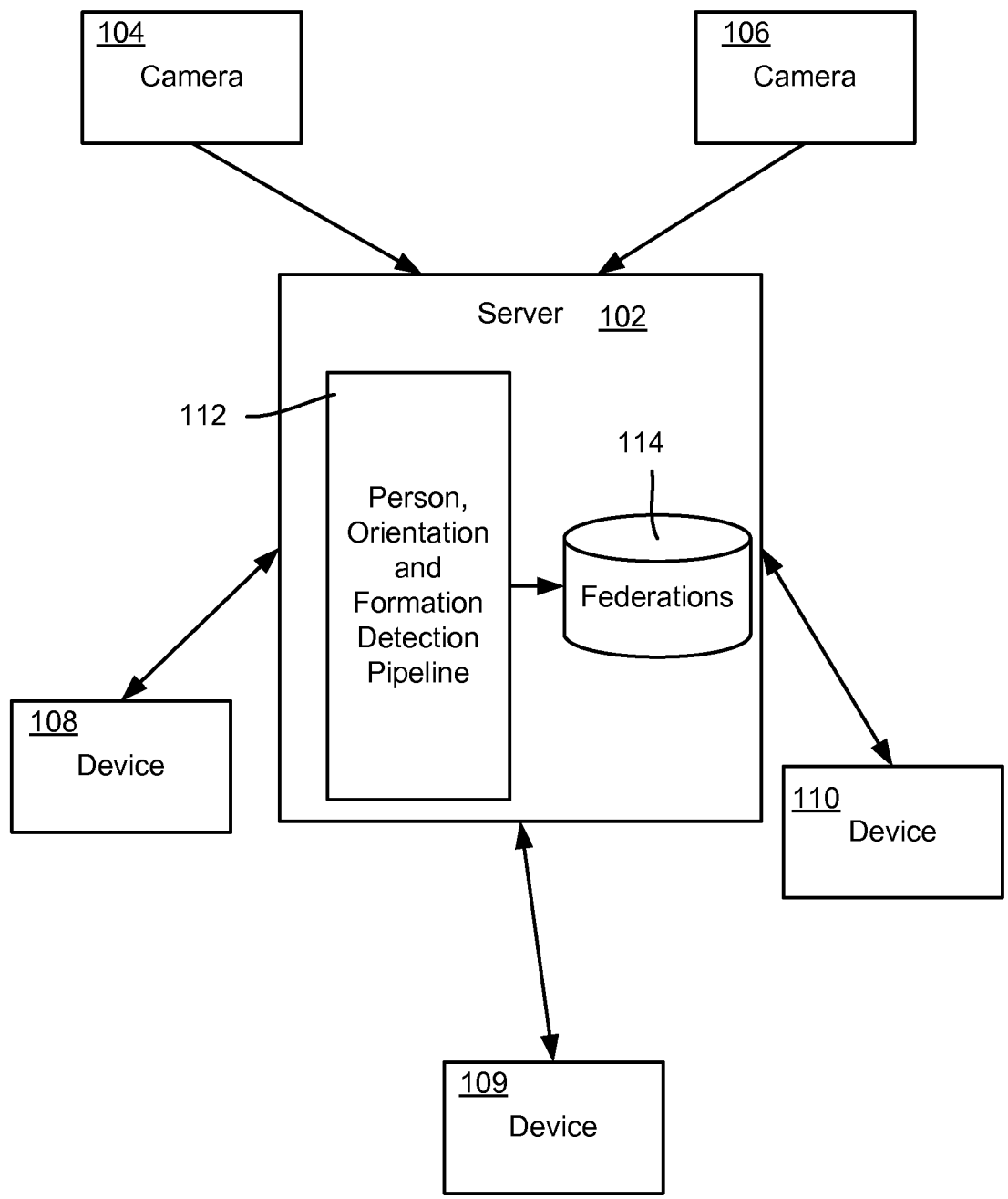
FIG. 1 is a block diagram showing an example architecture that allows content sharing/collaboration among federated devices based upon proxemics and micro-mobility actions detected at devices, according to one or more example embodiments.

As generally represented in FIG. 1, a server 102 receives images from depth sensors or the like (e.g., cameras and other sensors, referred to herein as cameras for simplicity) 104 and 106, and recognizes devices 108-110, such as by small radios coupled to each of the devices. Although two cameras 104 and 106 are depicted, it is feasible to have any practical number of cameras, as well as one or more pan/tilt or moving cameras, to provide a desired coverage.

Similarly, although three devices 108-110 are depicted, it is feasible to have from one to any number of devices, up to a practical limit for reasonably-sized "small" groups. Each of the devices runs a software program (e.g., an application) that coordinates with the server 102, receives input related to communicating information with other user devices based upon proxemics, and sends data to other user devices based upon proxemics and the input or receives data from other user devices based upon proxemics and input sensed at those devices.

The server 102 processes the camera images to determine whether one or more people are in the cameras' field of view, as represented by the person, orientation and formation detection pipeline 112 in FIG. 1; (examples of such stages/algorithms of the pipeline 112 are described below with reference to FIG. 5). If so, the server 102 determines the distance between the people and the orientations and the directions of the people to one another; (a singleton person is also detected). Fixed or semi-fixed features of the environment, such as wall computers, electronic whiteboards, digital tabletops, or even non-interactive furniture, walls, and dividers, may also be sensed and/or pre-registered in a database of features in the local context. When a federation 114 is detected corresponding to appropriate formations, the server 102 maintains a list or the like of one or more sets of federated devices, and updates the devices of a federation upon a state change. It is also possible for multiple sets of federated devices to overlap one another, e.g., a device may simultaneously be federated with two different groups, possibly with different permissions/relationships.

It is also feasible to have a federation with zero or more users. For example, devices may be arranged previously by users and maintain some relationship, even when no users are currently proximal. In this instance, the server does not detect people, or at least does not require people to be present to maintain the federation, but rather uses the devices. With one user a federation may change based upon proxemics, e.g. the facing or not facing of a single user to a wall display may be be used to federate that user's device and the wall display (or not).

In one implementation, the various system components are connected via TCP over wireless Ethernet, with a message protocol based upon Windows® Communication Framework (WCF) to transmit application and sensor state. The server 102 maintains a global model of the spatial relationships, and notifies clients of state changes.

As can be readily appreciated, the server may be a central server, or another model such as a peer model may be used. For example, the devices may include server code so that a central server is not needed, e.g., with one device acting as the server, possibly with assistance from another device or devices in the group (e.g., like a distributed server concept). Thus, a device may be a client of its own server.

Figure 2:
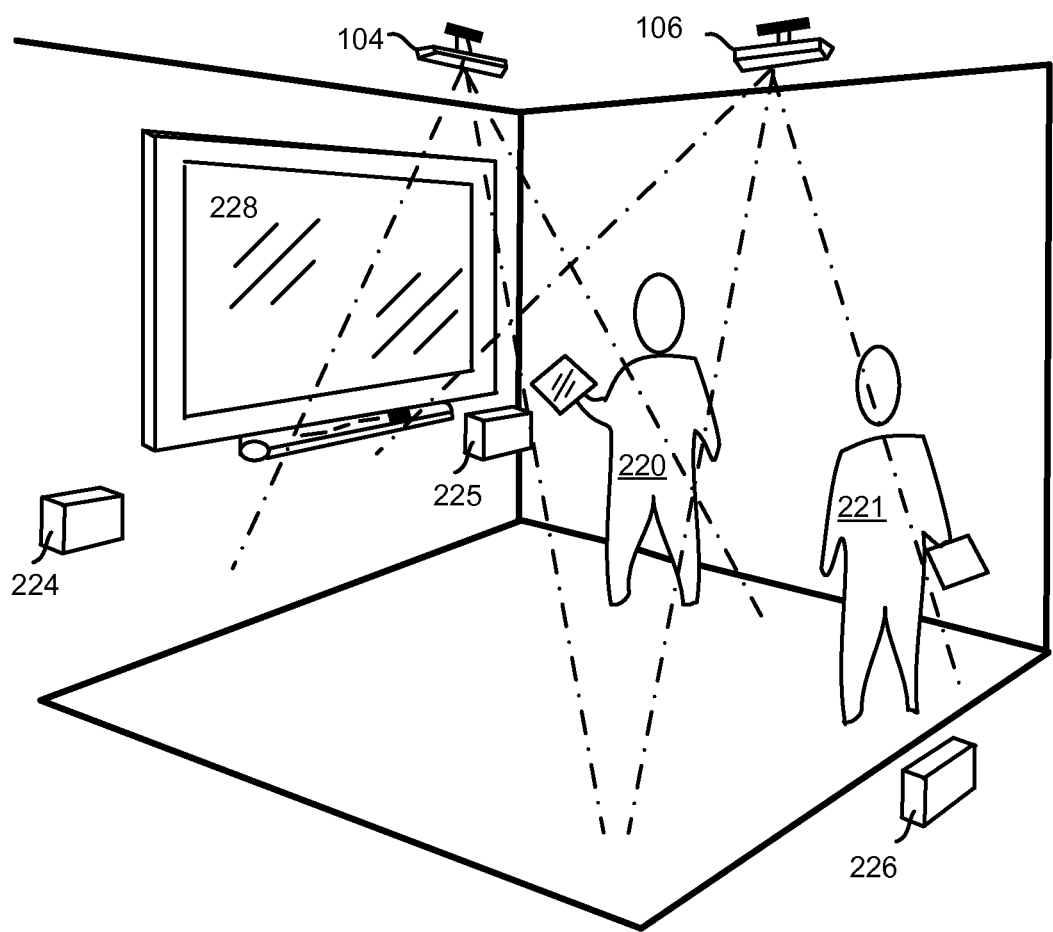
FIG. 2 is a representation of how users and devices may be sensed to establish and maintain a federation, according to one or more example embodiments.

In one implementation generally represented in FIG. 2, the cameras 104 and 106 comprise overhead depth (e.g., Kinect™) cameras that allow tracking persons (e.g., 220 and 221), generally in the form of moving blobs, that the server recognizes as people. Because the devices are not recognized by the cameras, radios are used to associate devices to sensed persons. However, devices with visible tags sensed by the camera, or RF (radio frequency) or other tags sensed by other means, are also feasible.

More particularly, as generally represented in FIG. 2, the overhead cameras allow the tracking of moving blobs that are recognized as people, while radios, along with wireless radio signal trilateration, associate devices carried by the sensed persons to the individual persons. In one implementation, the radios need line of sight for communication, which is beneficial in that the signals tend to stay within the social boundaries of meeting spaces delineated by walls, partitions, furniture and the like. Thus, QSRCT radios may be used, which have a maximum range of approximately 15 meters and also sense approximate distance between radio modules (at 10 cm accuracy at ninety percent confidence). Three point location (trilateration) is employed by putting three radio nodes (three such nodes 224, 225 and 226 are shown in FIG. 2) at fixed locations in the space around the edges of the area tracked by the depth cameras. A mobile radio on each device (not shown) sends range-finding requests to each fixed node and the resulting measurements are Kalman-filtered to reduce noise. The device location is then the intersection of the three circles.

The server matches the device to a person by assigning the device to the person who is standing closest (as sensed by the cameras 104 and 106) to the triangulated location. If the distance between the device and all currently tracked people is above a tolerance threshold (currently 1 m), the device remains unassigned. To assign other devices, the process is repeated with the remaining radios attached to the tablets. Note that an electronic whiteboard 228 is shown in FIG. 2. Such a device can be considered a participant, like a person, although radios need not be used with fixed devices because the location, type and "identity" of the fixed device do not change, at least not often. Further note that other types of devices may be participants. Note that a portable device such as a projector may have a radio, and thus is even more like a person.

Trilateration with the radios and matching of the radio IDs to the devices held by people tracked via the cameras allows associating each device to a particular person. This also facilitates identifying a person based on the device he or she carries (under the assumption that each person carries their own device). As people come and go from the field-of-view of the cameras, the radios enable tracking who is entering or leaving, as well as maintaining some awareness of whether the person has walked away, or still remains nearby but out of depth-camera view.

As can be readily appreciated, other techniques to associate people and devices may be used. For example, if the participants of a group are recognized in some way, such as by having to look up to the camera once to participate or speak their names (to facilitate facial recognition or voice recognition, respectively), or by sensing identification such as badges or those with radios/RFID tags or the like, then the system may access a list of device identifier(s) associated with each user. The system may then allow all devices associated with that user or that are registered by the user with the system for sharing, such as a tablet, cell phone, laptop and any other portable devices). Note that it is possible that the federated/not federated state of one user's multiple devices may not all be the same, e.g., a user may hold up his tablet while his phone is still in his pocket, for example, such that the tablet is fully federated but the phone is not.

Turning to behavioral sensing, namely the tracking of F-formations, as is known F-formations deal with the physical arrangements that people adopt when they engage in relatively close, focused conversational encounters. In general, F-formations consider the spatial relationships that occur as people arrange themselves during personal interaction for task-dependent communication and clarity of perception.

Figure 3:
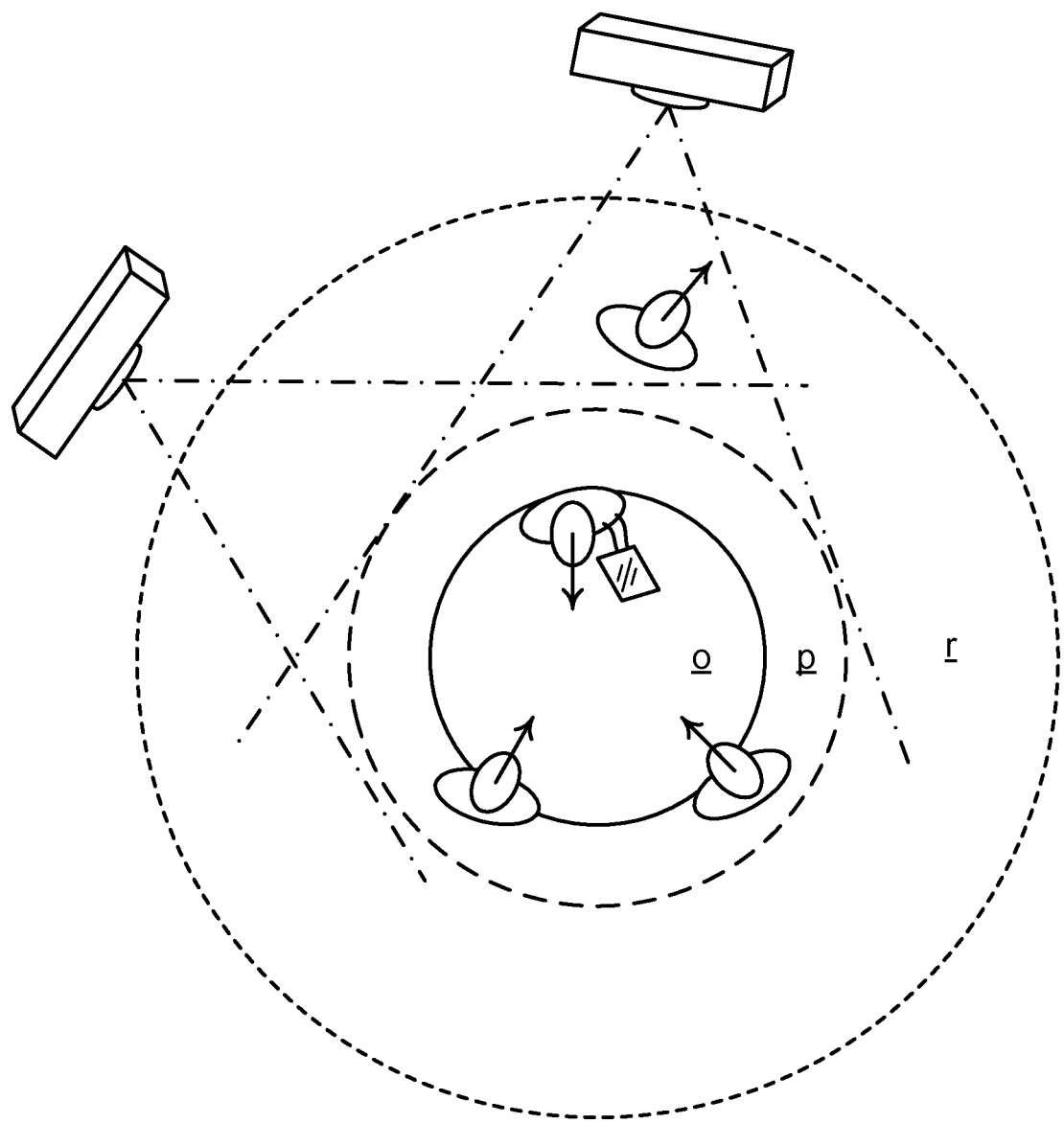
FIG. 3 is a representation how a formation of users may be sensed and used to establish a federation, according to one or more example embodiments.

As represented in FIG. 3, a typical F-formation arrangement is a roughly circular cluster that contains two to five persons who are actively part of a group. The inner space of that circle (referred to as o-space, labeled "o" in FIG. 3) is reserved for the main activity of the group. The ring of space occupied by the people (p-space, labeled "p" in FIG. 3) determines group membership. The surrounding region (r-space, labeled "r" in FIG. 3) buffers the group from the outside world. Thus, persons who are nearby but not in p-space are excluded from the fine-grained social circle that defines the F-formation. At the same time, the r-space is monitored to see if any others are trying to join. For example, an approaching person in r-space may be greeted by one or more members of the group via eye contact, while a person who is facing away, even if close to the group, is ordinarily not treated as a potential member.

Figure 4A:
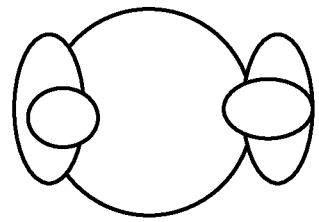
FIGS. 4A-4C are representations of different formations that may be sensed and used to establish and maintain a federation, according to one or more example embodiments.
Figure 4B:
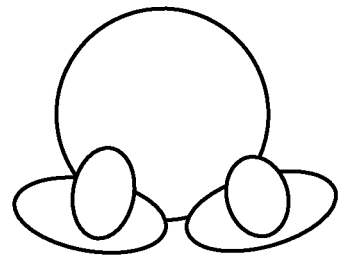
Figure 4C:
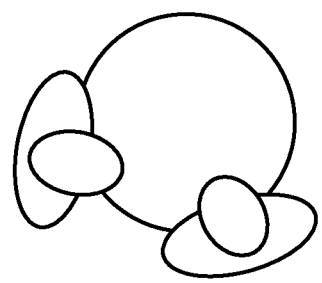

F-formations are often nuanced. For example, F-formations need not be circular. Instead, different relative body orientations are typical. Such orientations include face-to-face (FIG. 4A), which typically corresponds to competitive tasks. Other common orientations include side-by-side (FIG. 4B), typically corresponding to collaborative tasks, and corner-to-corner (L-shaped, FIG. 4C) typically corresponding to communicative tasks.

In one implementation, the overhead cameras 104 and 106 (e.g., mounted in the ceiling and looking downwards), capture the spatial relationships between people, including the distance, viewing direction, and relative body orientation between persons. A mechanism (e.g., an algorithm) as described herein aggregates these sensed persons into F-formations and classifies the type of assemblage, including face-to-face, side-by-side, corner-to-corner, (or as a singleton that is not a member of any formation).

Note that with respect to "distance," distance may be a generalized notion of a "social distance" and not necessarily a strictly Euclidean linear distance. The concept of "distance" may take into account relative body orientation, as well as boundaries of social spaces (e.g. office walls, partitions between cubicles, etc., if these are known; low-power radio technology may respect most such boundaries due to the frequency band employed, but also may go through some materials.

In one implementation Kinect™ field-of-view of 58.5 degrees, with the cameras mounted 200 cm above the floor, produces an approximate 220×94 cm tracking area per camera. The cameras may be arranged in an L-shaped sensing region (FIG. 2) and, with a one-time calibration step, compose the data into a combined depth image. For each depth image the orthographic projection of the camera view is calculated, with filters and linear interpolation used to remove noise resulting from the partial overlap of the cameras' structured light patterns.

Figure 5:
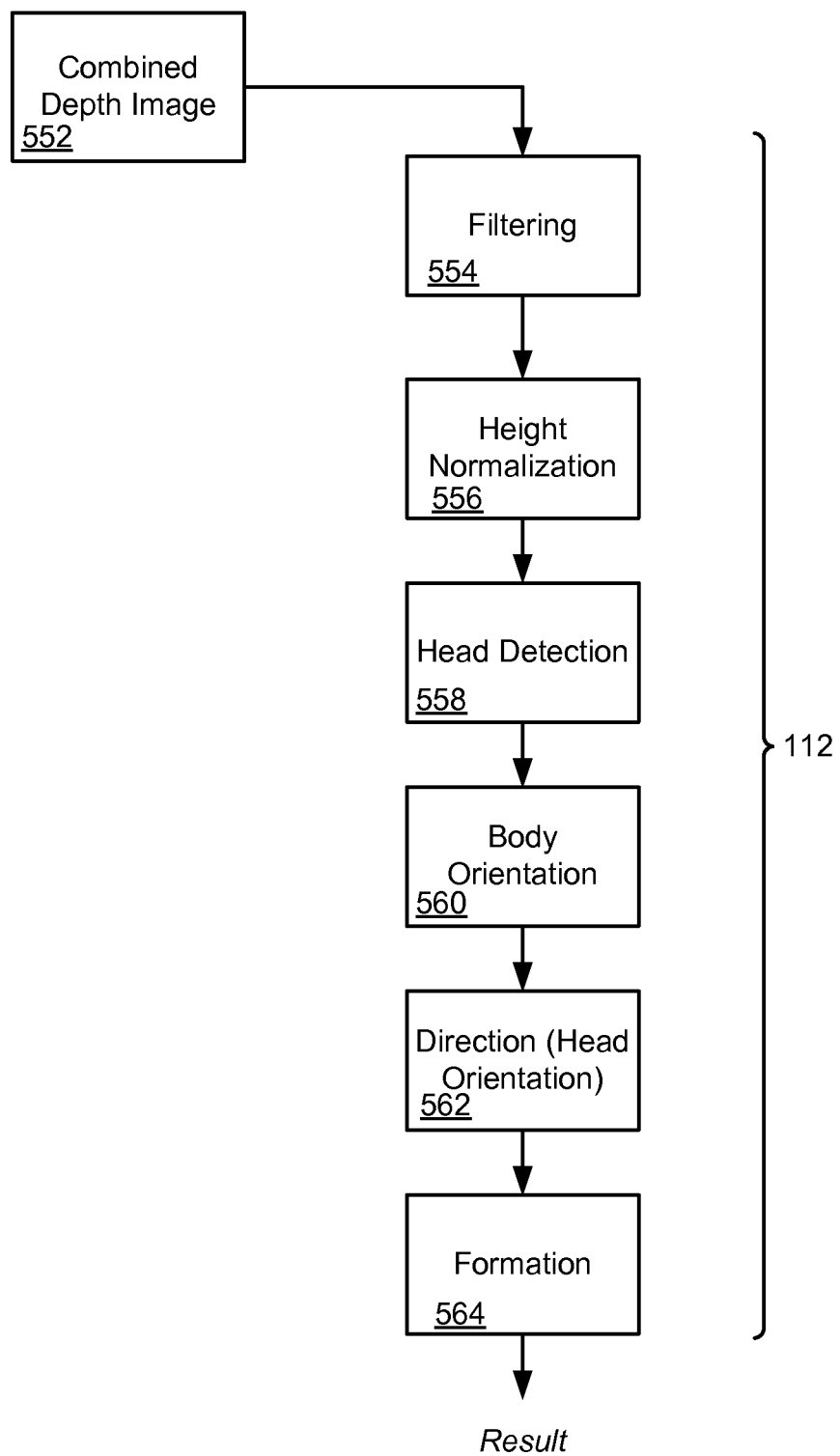
FIG. 5 is a representation of pipeline that may be used to process captured image data into a formation for establishing a federation, according to one or more example embodiments.

One implementation generally represented in FIG. 5 includes the processing pipeline 112 for F-Formation detection, in which the combined depth image 552 may be processed in multiple stages (or steps) to identify the location, orientation, and formations of people. In the pipeline, a filtering stage 554 filters out connected components that are too small or too large to be an actual person, leaving just those components most likely to represent a person; these are considered people thereafter in the example pipeline.

Height normalization 556 normalizes the heights of persons to match. One algorithm finds the highest point of the detected candidate people identified in the previous stage, and shifts the depth values of the remaining outlines of people by the difference in height.

Figure 6A:
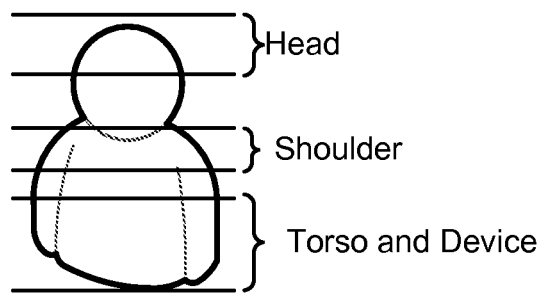
FIGS. 6A and 6B are representations of how a user and the user's orientation may be detected among depth data, according to one or more example embodiments.
Figure 6B:
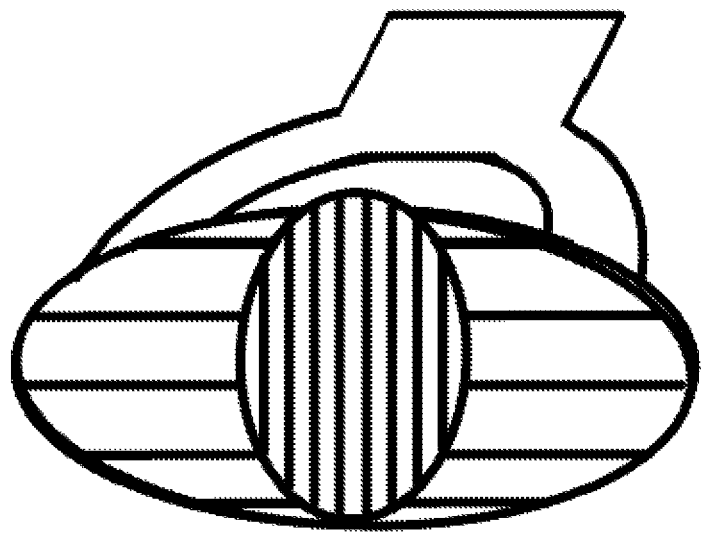

A head detection stage 558 detects heads by assuming the topmost depth band (in a separated two-dimensional (2D) image) represents people's heads. One algorithm identifies the connected components in this separated 2D image. The results are ellipsoidal outlines of people's heads. The major axis of the ellipse is used to determine as the orientation of the head. This is generally shown in FIGS. 6A and 6B, with the top down image "blob" (FIG. 6B) showing the head as an ellipse shaded with vertical stripes.

Another stage 560 of the pipeline calculates body orientation. A second depth band (FIG. 6A) includes all regions belonging to people's shoulders. Each detected shoulder region is assigned to the person to which it is closest. The convex hull is used (because the shoulder is not necessarily a single connected component) to get an ellipsoidal outline of a person's shoulders. The major axis of that ellipse gives the orientation of the person's body, shown in FIG. 6B as the ellipse shaded with horizontal lines.

The orientations calculated in the head detection and body orientation stages still have a 180-degree ambiguity. To determine which way the user is facing, a direction stage 562 takes a third depth band that corresponds to the user's torso, including their arms and hands (and any devices), as generally represented in FIG. 6A. The side of the major body axis that a person's arms and hands appear on, as well as which side the head is shifted towards, is taken as the front (shown as the unshaded portion of the blob in FIG. 6B). Hysteresis may be used to prevent momentary flips in the facing vector due to noise.

With respect to detecting F-Formations at a formation stage 564, two people can be in an F-formation if: (a) they are not standing behind each other, (b) the angle between their orientation vectors is smaller than 180 degrees (otherwise they would face away from each other), and (c) the distance between individuals is small enough so they can comfortably communicate and their o-spaces (FIG. 3) overlap. An algorithm iterates over all pairs of people, calculates the distance and angle between them, and assigns an F-formation type (e.g., side-by-side, L-shaped, face-to-face, or none) based on tolerance thresholds. Hysteresis prevents frequent switching of detected formations if measurements lie close to a threshold. Singletons and persons in R-space (outside a formation) are also detected and tagged.

Note that in one system, sensed formations lead to federated groups in which the barriers for sharing digital content are lowered. However, one system does not necessarily assume that people in a group want to share. Thus, a hybrid approach of sensed F-formations plus device micro-mobility may be used to initiate the actual cross-device sharing of content. This approach is directed to contexts such as small-group meeting spaces, where people have freedom of movement, but it may not be suitable for crowded environments such as a conference hall or subway station. In some embodiments, the system may disable, limit, or otherwise modify the number and scope of operations available to F-formations if a crowded environment is sensed. This may include deferring shared content to an asynchronous sharing mechanism which needs subsequent sign-in (password) or other validation to actually access the full content.

Note that asynchronous sharing may be used for other purposes. For example, users who have no devices associated with them may still participate in a group, (e.g., shared content may be retrievable by them in the cloud, later, in an asynchronous manner).

Described herein are various interaction techniques that facilitate the sharing of digital information between the devices of people standing in an F-formation. By way of example, some of the techniques described herein are based upon detected micro-mobility gestures; note however that in some embodiments these gestures are only active when the user is currently sensed as standing in an F-formation, or even a specific type of F-formation.

In general, the exemplified interaction techniques facilitate transient sharing, copying, transfer, and reference to digital information across federated devices. More particularly, the exemplified system offers multiple ways to support co-located collaborative activity, with various and nuanced semantics of what it means to "share" content. For purposes of explanation, a two-user F-formation involving handheld devices is used in some of the examples, in which the user initiating the interaction is the sender; and the other person is the recipient. As will be understood, the techniques work with more than two people, and also with a large display (or other fixed or semi-fixed features in the local environment).

A first technique is referred to as Tilt-to-Preview, with respect to previewing selected content. The Tilt-to-Preview technique provides a lightweight way to transiently share selected digital content across devices. The receiving user can elect to keep a copy of the transiently shared information.

Figure 7A:
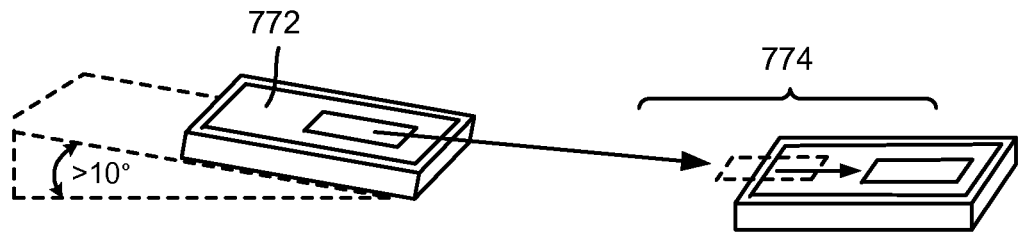
FIGS. 7A and 7B are representations of how micro-mobility actions (e.g., different device tilting) may be used to share data, according to one or more example embodiments.

While tilting within the o-space, the sender shares a selected piece of content by holding his or her finger on the piece of content while simultaneously tipping the tablet device 772 slightly, e.g., by a minimum of ten degrees (FIG. 7A). Tipping a slate beyond this threshold serves both as a gesture to trigger the behavior as well as a social cue observable to the recipient (and any other people nearby) that the sender wishes to share something. In two person F-formations, the sender tips the slate towards the other user. Alternatively, or if there are more than two people in the F-formation, the user can also tip the slate towards the o-space (i.e., the center of the formation).

Note that the above gesture has the user touching the content while tilting. Other gestures are feasible, and indeed, a user may configure the application to relate other gestures to actions. For example, consider that a user already has a piece of content selected (in any suitable way) for sharing. Instead of or in addition to tilting, the user may shake the device a certain way, or move it back and forth towards the recipient or o-space. This allows a user to maintain both hands on the device. Thus, any of the gestures and movements (e.g., tilting) described herein are only non-limiting examples.

This gesture is only active when the tablet is held up within o-space. When triggered one implementation causes a transient semi-transparent representation of the selected item to appear on the display of the devices in the current F-formation, i.e., this federation. To make it easy for recipients to identify who is offering an item, an animation slides-in the shared item from the side of the screen where the sender is standing, as generally exemplified by the simulated movement 774 via the arrows and dashed rectangle of content becoming an actual rectangle on the user's device. Note that the recipient can ignore such an overture by leaving his tablet down, in p-space or accept it by holding the tablet up. When the sender lets go of the transiently shared content, it disappears from the recipient's screen. However, the recipient can choose to keep a copy of the transiently shared content by touching a finger down and grabbing it while it remains visible. This precludes any need for either user to reach onto or towards the other's display, thereby avoiding persistent spatial invasion.

The content may be transferred through the server 102 or through another server. However, an alternative is to peer-to-peer transfer the content to a peer device based upon state information that informs the sending device the list of one or more federated devices to receive the content. Furthermore, such sharing may be deferred (e.g. with a reference to the content shared in real-time, and the actual content retrieved at a later time).

Turning to another example, referred to as "Face-to-Mirror" with respect to the full screen, a user can employ a larger tilt as a more demanding nonverbal request to interrupt the current thread of conversation and introduce something else. Users often employ large tilts to show content to their more distant partner in face-to-face formations. Face-to-Mirror is directed towards tilting to share a user's full screen view of the primary digital content displayed on the user's screen to any other tablets in the social group of an F-formation.

Figure 7B:
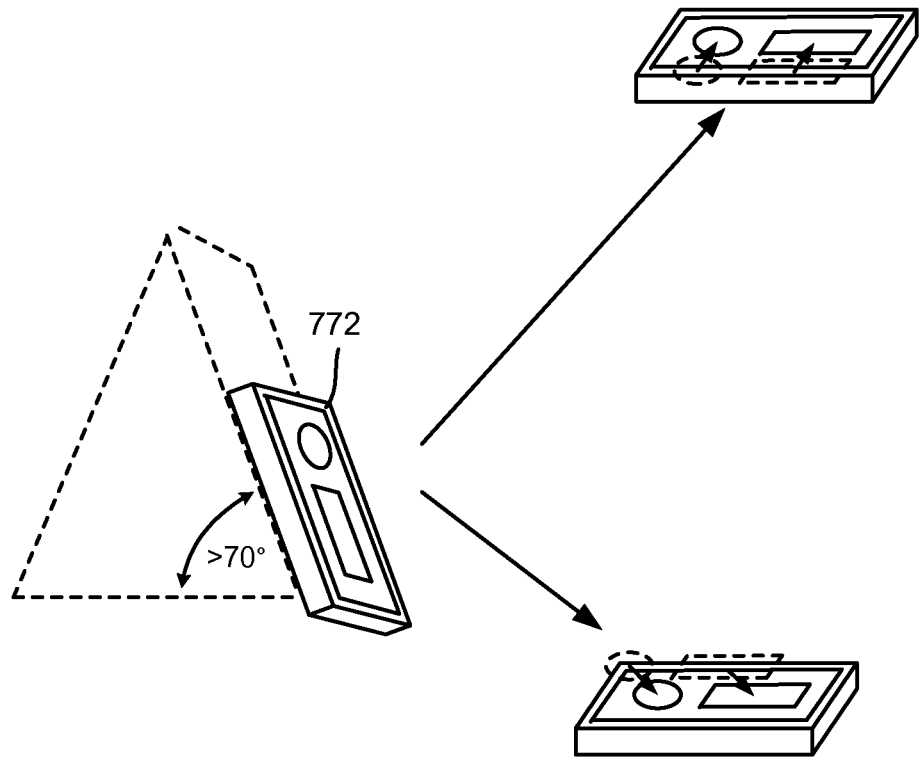

When a person holds their tablet vertically (at an angle larger than seventy degrees), the interactive canvas is mirrored, at full-screen scale, to the display of all other tablets of the group (FIG. 7B). Note that unlike Tilt-to-Preview, this may be a pure tilting gesture; the user does not have to touch the screen to explicitly select content. Thus, while the tilting motion is larger, the transaction cost of sharing is potentially lower because the required action is simply "show your screen to the others." The tilting motion is large enough that incidental tilting is not an issue with this technique. As with Tilt-To-Preview, Face-to-Mirror begins as a transient sharing technique that ends when the sender moves his slate away from the vertical posture, but where recipients can retain a copy by grabbing a mirrored item.

The above two techniques share a transient representation of an item, or a permanent copy if the recipient touches down and grabs it. To explore an alternative semantic of transferring content from one device to another (that is, moving rather than copying content), a Portals technique is used. Tilting is used as a micro-mobility gesture to establish a Portal.

In one implementation, when tilting a tablet (more than ten degrees) towards the device of any other group member, a tinted edge appears along the shared screen edge of the two tablets. By dragging an item through this edge and releasing the touch, the item is (permanently) transferred to the other device. A continuous cross-display animation may be used to reinforce the metaphor of the gesture, namely the content slides off the sender's screen, and slides into the recipient's screen. The recipient can then drag, resize, and otherwise manipulate the content that was transferred to his or her tablet. As with Tilt-to-Preview, the recipient only receives items sent through a Portal if the tablet is held up in o-space (as opposed to moving it down to p-space).

Note that to an extent the gesture for Portals is basically a hybrid of Tilt-to-Preview and Face-to-Mirror, in that the user performs a fairly subtle (greater than ten degree) tilting motion (like Tilt-to-Preview) to create the portal, but does not have to touch the screen while doing so. This means that Portals may be more prone to incidental tilting, however the feedback for Portals (a visually unobtrusive tinting along the matching edge of the devices) as well as the semantics of using the Portal (a transfer only occurs if the user explicitly passes an item through the shared edge of the Portal) means that there is very little impact if accidental activation of a Portal does occur.

Cross-Device Pinch-to-Zoom is another example technique, in which users can explicitly share items when the tablets are not tilted, but are held together side-by-side in o-space and at the same relatively flat angle. This technique allows viewing content across multiple tablet devices when using a pinch-to-zoom gesture. As typical of freeform canvas interfaces, a person can use a two finger pinch gesture to enlarge any content on the screen. However, with the knowledge of F-formations and the pose of nearby devices, when the sender enlarges the zoomed content beyond the visible area of the slate's display, the remaining content expands onto the surrounding tablets in o-space. That is, while the person zooms in, the content is displayed on the combined screen area of the tablets that form a particular f-formation (i.e., a larger cross-device virtual canvas is created).

While the above interactions illustrate examples that may apply to two-person F-formations, the techniques also apply to larger groups. As described above, for Tilt-to-Preview and Face-to-Mirror, for example, a person can share content with the entire group by tilting their tablet towards the center of the formation (i.e., towards o-space) rather than just tilting towards a single person.

Furthermore, the techniques described above may be implemented for the three types of F-formations (side-by-side, face-to-face, and corner-to-corner). Assemblage-specific gestures may be used. Note that the feedback on the screen (e.g. placement of the tinting indicating an active Portal) matches the spatial arrangement of users.

Likewise, users who are sensed as external to the F-formation cannot participate in group interactions, unless they move to stand within the group.

Turning to another aspect, a device that is not associated with a particular user may participate in a group, such as having a digital whiteboard 228 (FIG. 2) as part of an F-formation. As a result, users within a sensed F-formation can share content with the digital whiteboard in a manner analogous to sharing content to slates held by other participants. For example, consider the Hold-to-Mirror technique; a person can hold their tablet vertically towards the large display, and a temporary copy of the tablet's content appears on the large screen. Similarly, a person standing next to the whiteboard can use the Portals technique to move content to the large display by dragging content onto the edge of the slate facing towards the whiteboard 228.

Thus, one implementation considers the digital whiteboard in a manner similar to the human participants in an F-formation; that is, it has a particular location and a facing vector. When the digital whiteboard falls along the perimeter of p-space it is treated as part of the F-formation, but if the digital whiteboard falls outside the huddle, in r-space, it is not. For example, if a circle of users stands in front of the digital whiteboard, with one user's back to the display, and another user performs a Face-to-Mirror gesture, the content will be mirrored to the F-formation but not to the whiteboard. If instead the same circle expands to encompass the whiteboard, then the content is sent to the whiteboard as well.

Note that the user application may be configurable to prevent inadvertently sending content to such a device, e.g., by providing an icon or the like that the user needs to explicitly select before enabling such a transfer. This may prevent content from being viewed by others outside the group, such as if the whiteboard is visible from relatively far away.

Figure 8:
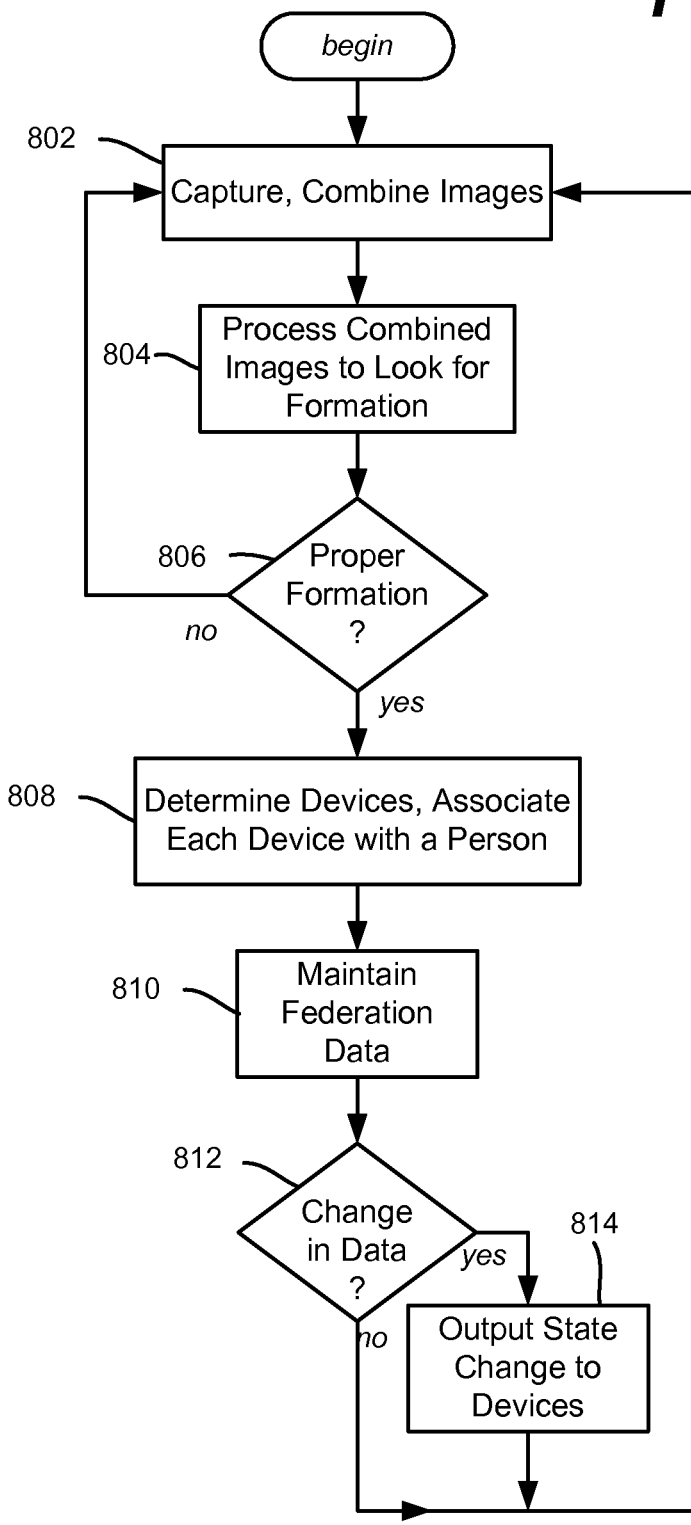
FIG. 8 is a flow diagram showing how a federation may be established and dynamically maintained, according to one or more example embodiments.

FIG. 8 is a flow diagram summarizing some example steps taken by the server, beginning at step 802 where the images are captured and combined. Step 804 processes the images to look for a formation, e.g., using the pipeline described above. Note that there is only a proper formation when more than one person (including any participating device) is present at the appropriate distances and orientations, and thus step 806 returns to step 802 when there is not a proper formation.

When there is a formation, step 808 represents determining which devices are in the formation, and associates each device with a person; (except for other devices such as a whiteboard). Step 810 maintains the information (e.g., the devices and associated participants) as federation data for this group.

Step 812 represents evaluating whether the data has changed, e.g., whether a new user/device has joined the federation, or another has left relative to the last state update. Note that the first time a formation is detected, this is a change to the previous state of no formation. Step 814 propagates the state change to each device in the federation.

Note that distance (and relative body orientation) is not necessarily the same between devices versus that between users. For example, two devices may be very close to one another, yet move in and out of a federation depending on who the owner is facing/talking to.

As can be seen, there is described the combination of sensing human body distance and orientation (proxemics) with sensing device presence and motions (e.g., subtle tilts) or other interactions that are given meaning and significance by a social situation. Coarse-grained relative device locations (e.g., distance, as well as angle when triangulation is possible) may be used based upon low-power radio proximity sensing integrated with the devices, which establishes device identity and lets the system maintain awareness of nearby devices that are not in the sensing range of other (e.g., camera) sensors.

The technology includes algorithms and approaches for overhead depth sensing of small group formations and classification into types (e.g. side-by-side, face-to-face, corner-to-corner) with other pairwise relationships, along with the treatment of singletons. Single touch, multi-touch and pen gestures may be used to provide natural, intuitive, and meaningful gestures for sharing. Small group sensing may be adjusted based on the presence situated devices such as wall displays/electronic whiteboards.

EXAMPLE COMPUTING DEVICE

As mentioned, advantageously, the techniques described herein can be applied to any device. It can be understood, therefore, that handheld, portable and other computing devices and computing objects of all kinds including standalone cameras are contemplated for use in connection with the various embodiments. Accordingly, the below general purpose remote computer described below in FIG. 9 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
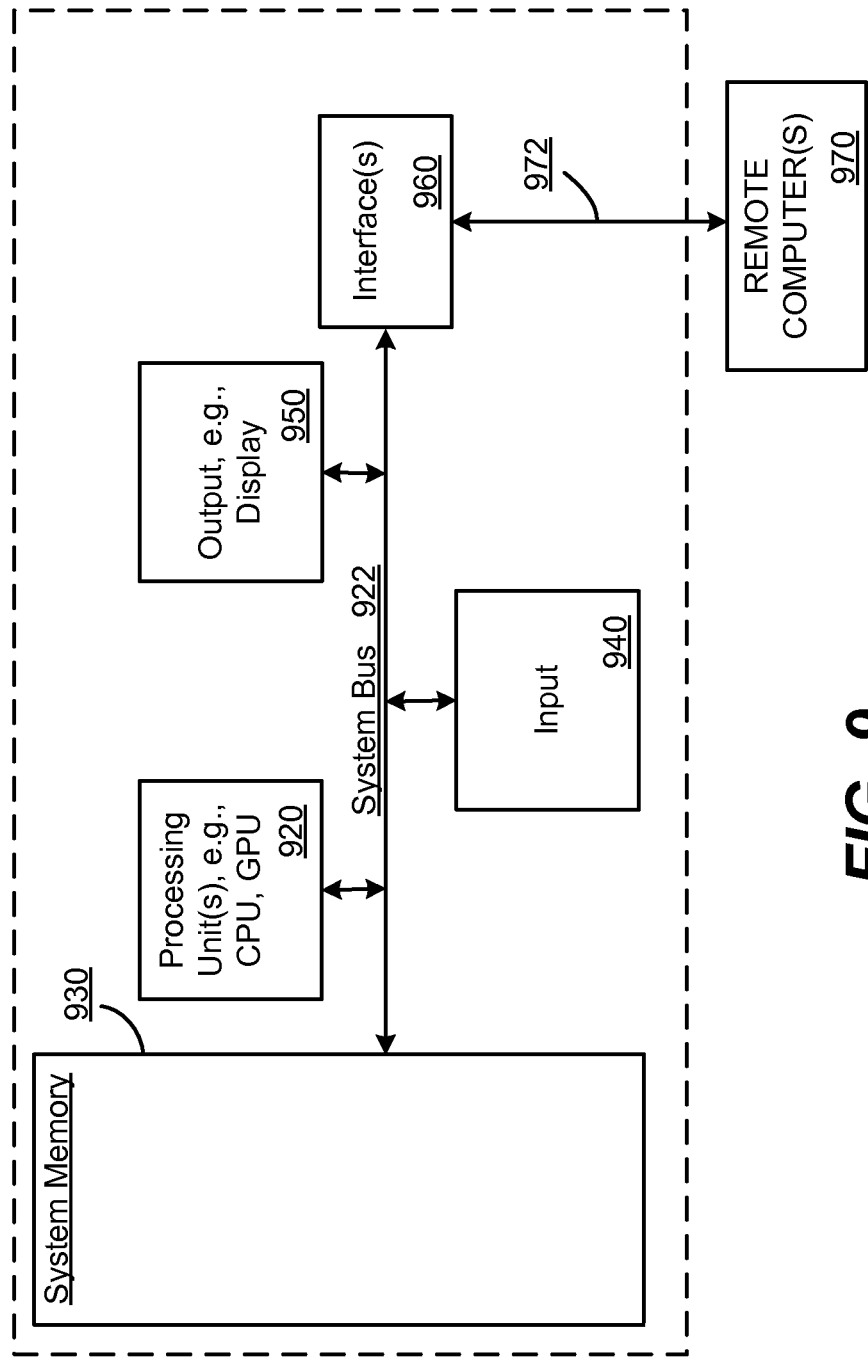
FIG. 9 is a block diagram representing an example environment into which aspects of the subject matter described herein may be incorporated.

FIG. 9 thus illustrates an example of a computing environment 900 in which one or aspects of the embodiments described herein (such as the anti-shake correction controller) can be implemented, although as made clear herein, the computing environment 900 is only one example of a suitable computing environment and is not intended to suggest any limitation as to scope of use or functionality. In addition, the computing environment 900 is not intended to be interpreted as having any dependency relating to any one or combination of components illustrated in the example computing environment 900.

With reference to FIG. 9, an example remote device for implementing one or more embodiments includes a processing unit 920, a system memory 930, and a system bus 922 that couples various system components including the system memory to the processing unit 920.

The environment may include a variety of logic, e.g., in an integrated circuit chip and/or computer-readable media which can be any available media that can be accessed. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information through input devices 940. A monitor or other type of display device also may be connected to the system bus 922 via an interface, such as output interface 950. In addition to a monitor, other peripheral output devices such as speakers may be connected through output interface 950.

The system may be coupled to one or more remote computers, such as remote computer 970. The remote computer 970 may be a personal computer, a server, a router, a network PC, a peer device or other common network node, or any other remote media consumption or transmission device, and may include any or all of the elements described above. The logical connections depicted in FIG. 9 include a bus such as a USB-based connection, or a wireless networking connection. Also, there are multiple ways to implement the same or similar functionality, e.g., an appropriate API, tool kit, driver code, operating system, control, standalone or downloadable software objects, etc., which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system comprising:
a sending device; and
a recipient device configured to:
receive content from a sending device, the sending device and the recipient device being participants in a federation established by proxemics between the sending device and the recipient device; and render the content in partial, increasing amounts over time until the content is fully rendered, the rendering in partial, increasing amounts occurring from one direction based upon a location of the sending device relative to the recipient device to have the content appear to have come from a direction of the sending device relative to the recipient device.

2. The system of claim 1, further comprising a server configured to:

maintain federation data corresponding to:

which digital devices are in the formation, the digital devices comprising the sending device and the recipient device; and which users associated with the digital devices are facing a particular direction in the formation; and communicate the federation data to the digital devices in the formation to establish a federation between the digital devices in the formation, the federation between the digital devices in the formation enabling the digital devices in the formation to communicate content with one another based upon one or more micro-mobility actions detected by at least one of the digital devices in the formation, the micro-mobility actions comprising one or more of the following: device tilting, touch gesture, pen gesture, and multi-touch gesture; and wherein the server dynamically updates the federation data and the digital devices in the formation upon a change to the formation.

3. The system of claim 2 wherein the images comprise depth data, and wherein the server includes a processing pipeline that determines users within the depth data and the orientation of the users relative to one another.

4. The system of claim 3 wherein the orientation of the users relative to one another comprises a face to face orientation, a side-to-side orientation, or a corner-to-corner orientation.

5. The system of claim 2 wherein the server comprises a central server coupled to one or more cameras that provide the image data.

6. The system of claim 2 further comprising a digital device in the federation that is associated with the federation by proxemics but not associated with any one user.

7. The system of claim 6 wherein the digital device comprises a digital whiteboard or other display mechanism configured to render content.

8. The system of claim 2 further comprising radios having signals that are detected to associate the digital devices to users.

9. A method comprising:

receiving content at a recipient device from a sending device, the sending device and the recipient device being participants in a federation established by proxemics between the sending device and the recipient device; and rendering the content on the recipient device in partial, increasing amounts over time until the content is fully rendered, the rendering in partial, increasing amounts occurring from one direction based upon a location of the sending device relative to the recipient device to have the content appear to have come from a direction of the sending device relative to the recipient device.

10. The method of claim 9, further comprising:

determining proxemics among a plurality of devices, the plurality of digital devices comprising one or more of the following: at least two users having digital devices, at least one user and at least two digital devices, and at least two digital devices;

establishing a federation between the plurality of digital devices;

maintaining federation data indicative of the federation; and using the federation data to determine a set of federated devices that are able to communicate data between one another based upon the federation and one or more micro-mobility actions, the micro-mobility actions comprising one or more of the following: device tilting, touch gesture, pen gesture, and multi-touch gesture;

wherein maintaining the federation data comprises updating the federation data upon a change to the federation, and wherein using the federation data to determine the set of federated devices comprises communicating the federation data to the devices.

11. The method of claim 10 further comprising associating detected users with the devices.

12. The method of claim 10 wherein one sending device of the federated devices shares content to at least one recipient device of the federated devices based upon the one or more of the micro-mobility actions, the sharing of content comprising moving the content from the sending device to the at least one recipient device or copying the content from the sending device to the at least one recipient device.

13. The method of claim 12 further comprising, at a recipient device, saving a copy of the content shared thereto based upon user interaction with the recipient device.

14. The method of claim 12 further comprising detecting a tilting of the sending device prior to sharing the content.

15. The method of claim 12 further comprising, taking one of a plurality of sharing actions based upon an amount of tilt detected by the sending device.

16. The method of claim 9 further comprising sharing content to one of the plurality of devices that displays the content to a plurality of users.

17. One or more computer-readable storage media having computer-executable instructions, which when executed on at least one processor perform operations comprising:

receiving content at a recipient device from a sending device, the sending device and the recipient device being participants in a federation established by proxemics between the sending device and the recipient device; and rendering the content on the recipient device in partial, increasing amounts over time until the content is fully rendered, the rendering in partial, increasing amounts occurring from one direction based upon a location of the sending device relative to the recipient device to have the content appear to have come from a direction of the sending device relative to the recipient device.

18. The one or more computer-readable storage media of claim 17 having further computer-executable instructions comprising:

detecting, at the sending device, one of a first micro-mobility action or a second micro-mobility action; and sharing a full screen of content based on the first micro-mobility action or sharing less than a full screen of content based upon the second micro-mobility action.

19. The one or more computer-readable storage media of claim 18, wherein the first micro-mobility action and the second micro-mobility action comprises one or more of the following: device tilting, touch gesture, pen gesture, and multi-touch gesture.

20. The one or more computer-readable storage media of claim 19, wherein a difference between the first micro-mobility action and the second micro-mobility action is an amount of tilt detected by the sending device.

* * * * *